(12) United States Patent
Bodin et al.

(10) Patent No.: US 11,643,146 B2
(45) Date of Patent: May 9, 2023

(54) OVERLAPPING ELONGATE STEEL STRUCTURE AND METHOD OF PRODUCING SUCH AN ELONGATE STEEL STRUCTURE

(71) Applicant: Gestamp Hardtech AB, Luleå (SE)

(72) Inventors: Hans Bodin, Södra Sunderbyn (SE); Joakim Johansson, Luleå (SE)

(73) Assignee: Gestamp Hardtech AB, Luleå (SE)

( * ) Notice: Subject to any disclaimer, the term of this patent is extended or adjusted under 35 U.S.C. 154(b) by 150 days.

(21) Appl. No.: 17/293,141

(22) PCT Filed: Nov. 15, 2019

(86) PCT No.: PCT/EP2019/081452
§ 371 (c)(1),
(2) Date: May 12, 2021

(87) PCT Pub. No.: WO2020/104310
PCT Pub. Date: May 28, 2020

(65) Prior Publication Data
US 2022/0001932 A1    Jan. 6, 2022

(30) Foreign Application Priority Data
Nov. 22, 2018   (SE) .................................. 1851446-3

(51) Int. Cl.
*B62D 25/04* (2006.01)
*B62D 27/02* (2006.01)
(Continued)

(52) U.S. Cl.
CPC ........... *B62D 25/04* (2013.01); *B21D 22/203* (2013.01); *B23K 11/11* (2013.01); *B62D 25/00* (2013.01);
(Continued)

(58) Field of Classification Search
CPC ....... B62D 25/04; B62D 25/00; B62D 27/023
(Continued)

(56) References Cited

U.S. PATENT DOCUMENTS 7,828,357 B2 *  11/2010  Hayashi ................. B62D 25/06
                                                          296/29
9,744,997 B2 *   8/2017  Olofsson ................. C22C 38/00
(Continued)

FOREIGN PATENT DOCUMENTS

EP       0953495 A2    11/1999
EP     1 953 072 A1     8/2008
(Continued)

*Primary Examiner* — Dennis H Pedder
(74) *Attorney, Agent, or Firm* — Blank Rome LLP

(57) ABSTRACT

The invention relates to an elongate steel structure (10) for a vehicle comprising:—first steel sheet element (11), and a second steel sheet element (12), said first and second steel sheet elements constituting opposite ends of the elongate steel structure and said first and second steel sheet elements overlapping each other in a mid-portion of said elongate steel structure, wherein the first and the second steel sheet elements have an overlapping hat profile including a central portion (17), two webs (18), and two flanges (19), wherein at least one of the first and second steel sheet elements include cut-outs (13) along the flanges (19) such that the overlap is interrupted along said flanges (19).

12 Claims, 3 Drawing Sheets

(51) Int. Cl.
  *B62D 29/00* (2006.01)
  *B21D 22/20* (2006.01)
  *B23K 11/11* (2006.01)
  *B62D 25/00* (2006.01)

(52) U.S. Cl.
  CPC ......... *B62D 27/023* (2013.01); *B62D 29/007* (2013.01)

(58) Field of Classification Search
  USPC ........................................ 296/29, 30, 193.06
  See application file for complete search history.

(56) References Cited

U.S. PATENT DOCUMENTS

| | | | |
|---|---|---|---|
| 2016/0082542 A1* | 3/2016 | Hiramatsu | B23K 11/0026 403/270 |
| 2018/0029648 A1 | 2/2018 | Von Watzdorf et al. | |

FOREIGN PATENT DOCUMENTS

| | | |
|---|---|---|
| JP | H05 215 U | 1/1993 |
| JP | H05-212473 A | 8/1993 |
| JP | H1029558 A * | 2/1998 |
| JP | 3882774 B2 * | 2/2007 |
| WO | WO 2008/024042 A1 | 2/2008 |
| WO | WO 2014/017961 A1 | 1/2014 |

* cited by examiner

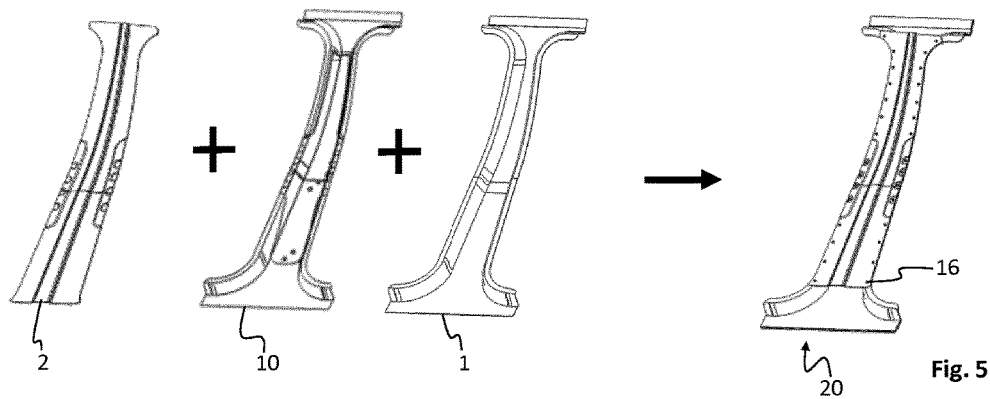
Fig. 5
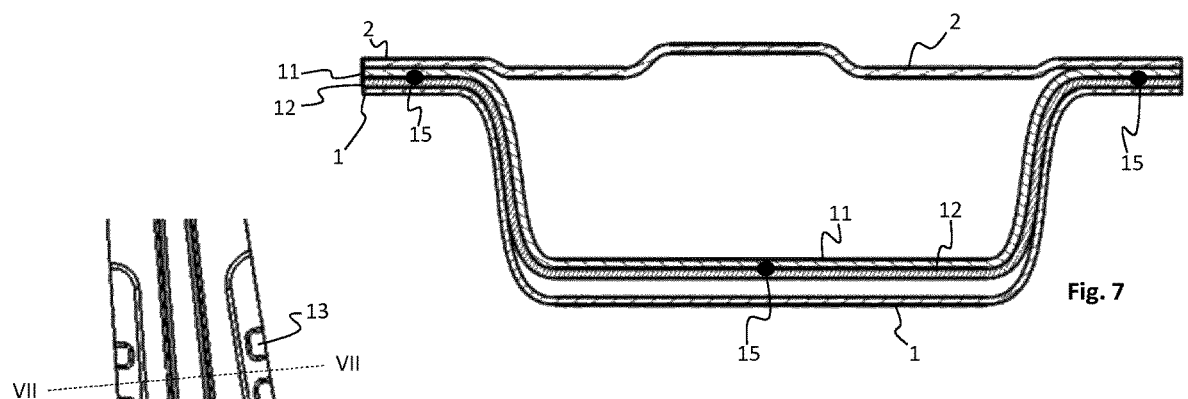
Fig. 6
Fig. 7
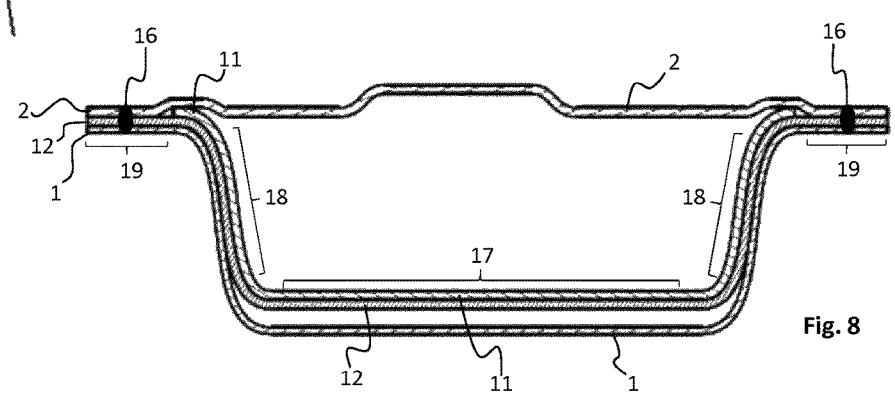
Fig. 8

OVERLAPPING ELONGATE STEEL STRUCTURE AND METHOD OF PRODUCING SUCH AN ELONGATE STEEL STRUCTURE

TECHNICAL FIELD

The invention relates to an elongate steel structure made from two overlapping parts. The invention also relates to a vehicle including such an elongate steel structure and a method of producing such an elongate steel structure.

BACKGROUND

In the automotive industry, weight and structural strength are important features for most components, especially components of the body in white. Further, these features tend to counteract each other, such that often a compromise need to be done between weight and structural strength.

A way of achieving a good compromise between weight and structural strength is to apply patches of a material at areas of an element that are particularly exposed to mechanical efforts. Such patches may e.g. be made of a metallic plate or of a fibre-reinforced plastic material, wherein the patch may be attached to a metallic blank by e.g. welding or by heat pressing. Such patching is particularly useful for small area.

Further, it is possible to achieve a product with different properties at different portions by combining two elements of different properties into one combined element.

EP 2 056 979 B1 discloses a method of hot-shaping and hardening an object from a metal sheet that is comprised of two sheet steel elements with an overlapping portion. This has proven to be a useful manner of achieving steel products with tailor made mechanical properties.

For some details of a body in white of a vehicle it may however be useful to find another way of achieving a good structural strength without unduly increasing the weight of the detail.

SUMMARY OF THE INVENTION

It is an object of the invention to provide an elongate steel structure for a vehicle, which elongate steel structure has a good structural strength/weight ratio, and which has an elevated structural strength at portions where such elevated structural strength is needed, particularly in a mid-section of the elongate steel structure.

According to a first aspect the invention relates to an elongate steel structure for a vehicle comprising:
 a first steel sheet element,
 a second steel sheet element, said first and second steel sheet elements constituting opposite ends of the elongate steel structure and said first and second steel sheet elements overlapping each other in a mid-portion of said elongate steel structure, but not over said opposite ends of the elongate steel structure wherein the first and the second steel sheet elements have an overlapping hat profile including a central portion, two webs, and two flanges, and wherein at least one of the first and second steel sheet elements include cut-outs along the flanges such that the overlap is interrupted along said flanges, and wherein at least one of the first and second steel sheet elements includes a tongue arranged to extend over the central portion of the opposite steel sheet element, such that the overlap of the steel sheet elements is longer over the central portion than over the flanges.

The invention makes it possible to provide an elongate steel structure for a vehicle with differentiated properties over its length, with supplementary strength where needed, and with a structure that allows it to be welded between two other steel structures.

The interruption of the overlap along the flanges does not mean that the extension of the flanges as such is interrupted. Only one of the steel sheet elements include a cut-out at a specific location such that the flange of the other steel sheet element has no cut-out at said location, wherein the extension of the flange is uninterrupted.

In specific embodiments of the invention only one of the first and second steel sheet elements include cut-outs along the flanges. The other of the first and second steel sheet elements preferably have uninterrupted flanges with no cut-outs.

In specific embodiments of the invention the first steel sheet element forms an upper part of the elongate steel structure and the second steel sheet element forms a lower part of the elongate steel structure and wherein the first and second steel sheet elements overlapping each other for a majority of a full length of the central portion.

The two flanges of the hat profile of the elongate steel structure may be uninterrupted, the first steel sheet element providing the upper part of the flanges, the second steel sheet element providing a lower part of the flanges, and a partially overlapping portion of the first and second steel sheet element providing a mid-section of the flanges, said partially overlapping portion of the flanges including cut-outs.

In specific embodiments of the invention welds are provided in the partially overlapping portion of the flanges between said cut-outs, said welds being provided to attach the flanges of the first and the second steel sheet element to each other.

Welds may also be provided in the partially overlapping portion of the central portion to attach the central portions of the first and the second steel sheet element to each other.

In specific embodiments of the invention both the first and second steel sheet elements may include a tongue arranged to extend over the central portion of the opposite steel sheet element. This will provide a very good attachment between the plates and a good rigidity of the central portion of the hat profile.

In specific embodiments of the invention the first and second steel sheet elements have different mechanical properties. Specifically, the first and second steel sheet elements may have different mechanical thicknesses.

According to a second aspect the invention relates to a vehicle that comprises an elongate steel structure according to anyone of the preceding claims.

According to a third aspect the invention relates to a method of hot shaping an elongate steel structure for a vehicle from two sheet steel blanks, which method comprises the steps of producing the vehicle part in at least one forming step with overlapping steel sheet blanks, wherein separate portions of each steel blank and an overlapping portion of the sheet steel blanks there between is formed into a hat profile including a central portion, two webs, and two flanges, wherein said overlapping portion of the sheet steel blanks is two sheeted, and wherein in said overlapping portion at least one of the first and second steel sheet elements include cut-outs along the flanges such that the overlap is interrupted along said flanges at said cut-outs.

In specific embodiments of the method, the forming of the steel sheet blanks is performed as hot shaping after heating of said steel sheet blanks.

In specific embodiments of the method, the steel sheet blanks are welded to each other prior to the forming.

Specifically, the steel sheet blanks may be welded to each other in the flanges between the cut-outs.

Also, the steel sheet blanks may be welded to each other in the central portion.

An advantage of the inventive elongate steel structure is that it provides an increased structural strength in the mid-section of said elongate steel structure Other embodiments and advantages will be apparent from the detailed description and the appended drawings.

BRIEF DESCRIPTION OF THE DRAWINGS

Below, specific embodiments of the invention will be described with reference to the appended drawings, of which;

FIG. 5 illustrates the assembly of an elongate steel structure between a panel of a vehicle and a cover plate, FIG. 6 is detailed view of the mid-section of an elongate steel structure between a panel and a cover plate, FIG. 7 is a sectional view taken along the line VII-VII in FIG. 6, and FIG. 8 is a sectional view taken along the line VIII-VIII in FIG. 6.

DETAILED DESCRIPTION OF THE SHOWN EMBODIMENTS

Figure 1:
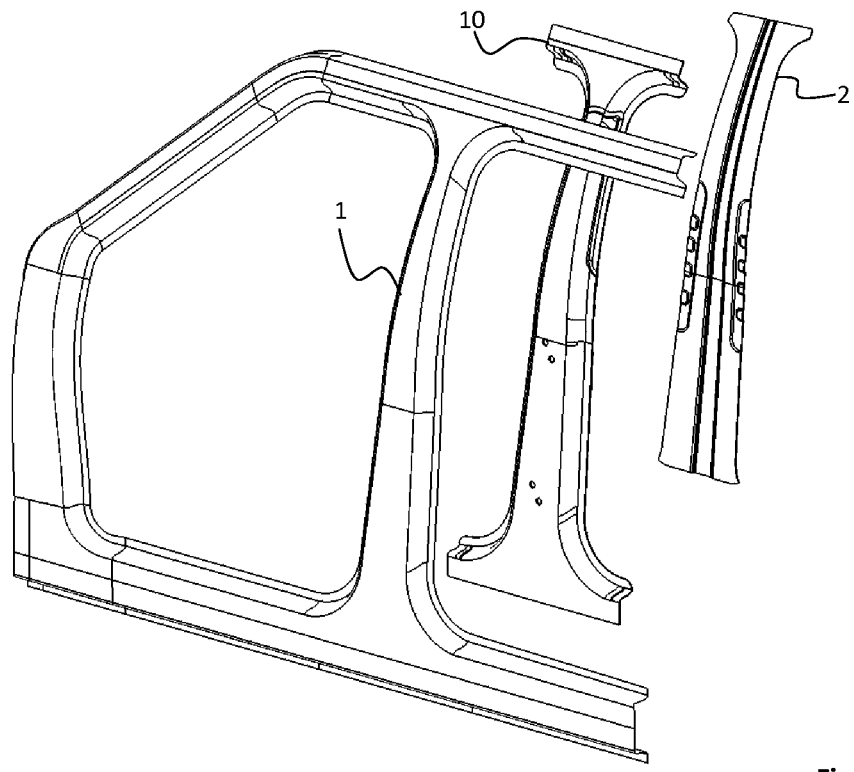
FIG. 1 is an exploded view of a B-pillar arranged between a panel of a vehicle and a cover plate.

FIG. 1 is an exploded view of an elongate steel structure 10 arranged between a panel or bodywork 1 of a vehicle and a cover plate 2. In the shown embodiment the elongate steel structure 10 is a B-pillar, i.e. the part of the body in white forming the beam between a front door and a back door of a vehicle. The invention may however of course be adapted to any type of elongate steel structure of a vehicle. The elongate steel structure 10 has an upper end arranged to be directed upwards in a vehicle, and a lower end arranged to be directed downwards in a vehicle.

Figure 2:
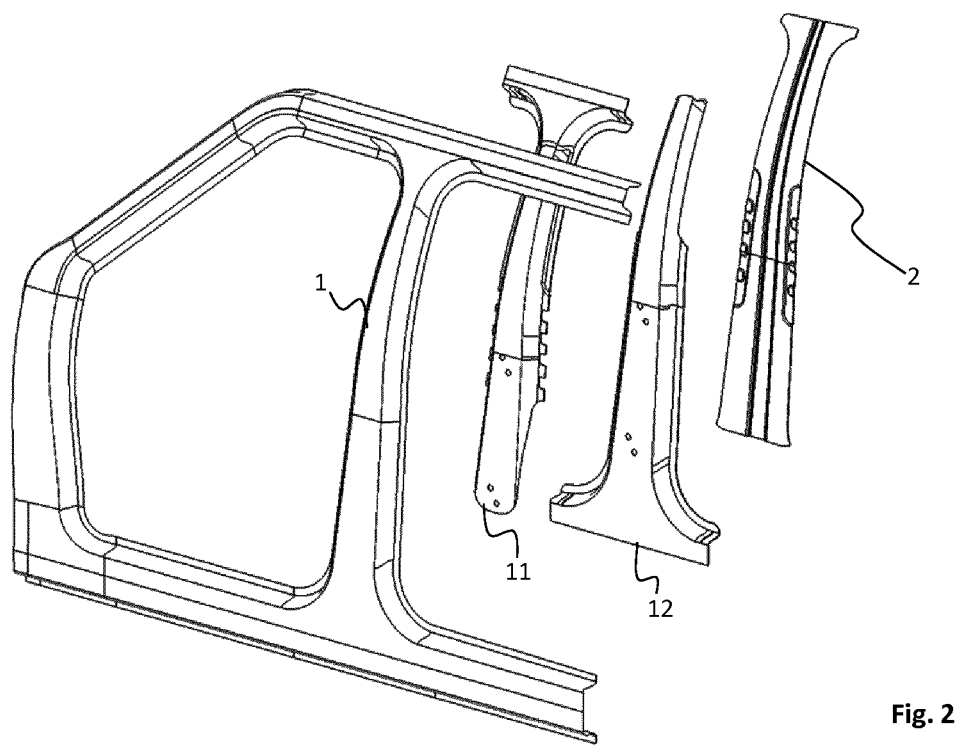
FIG. 2 is an exploded view where the B-pillar is separated into overlapping upper and lower parts.

The invention relates to an elongate steel structure 10 formed from two overlapping parts. In FIG. 2 the elongate steel structure 10 is illustrated as an upper steel sheet element 11, provided to extend to the upper end of the elongate steel structure 10, and a lower steel sheet element 12, provided to extend to the lower end of the elongate steel structure 10 with overlapping mid-sections. The upper steel sheet element 11 does not extend to the lower end of the elongate steel structure 10, and the lower steel sheet element 12 does not extend to the upper end of the elongate steel structure 10.

The illustration of a parted elongate steel structure 10 in FIG. 2 is however for illustrative purposes only. Namely, as will be described below, the overlapping parts of steel sheets are preferably attached to each other before being formed into an elongate steel structure 10.

Figure 3:
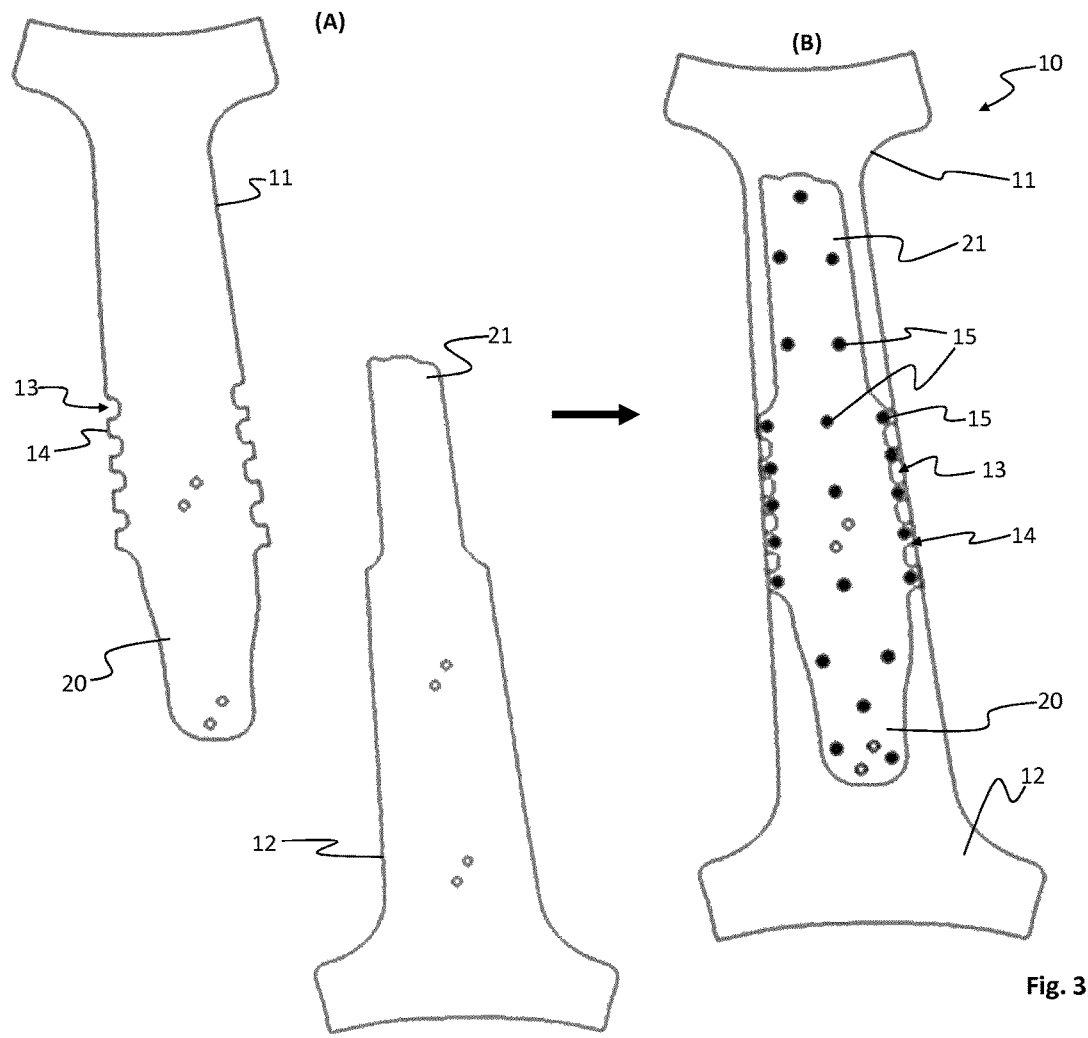
FIG. 3 illustrates the assembly of overlapping parts into an elongate steel plate.

FIG. 3 shows a first and a second steel sheet elements 11 and 12 in the form of blanks, before being formed into an elongate steel structure 10 of a vehicle.

The first and second steel sheet elements 11 and 12 constitute opposite ends of an elongate steel structure 10. The first and second steel sheet elements are configured to overlap each other in a mid-section of said elongate steel structure. In the assembled product (see e.g. FIG. 4) the first and the second steel sheet elements are attached to each other, preferably by welding, and have an overlapping hat profile. The elongate steel structure 10 has an elongate shape with a cross-sectional hat profile in an overlapping mid-section.

In a first step (A), a first steel sheet element 11 and a second steel sheet element 12 are provided, wherein at least one of the first and second steel sheet elements include cut-outs along the flanges such that the overlap of the first and the second steel sheet elements is interrupted along said flanges. The first steel sheet element 11 is provided to form an upper part of an elongate steel structure 10 and the second steel sheet element 12 is provided to form a lower part of the same elongate steel structure 10.

In a second step (B) overlapping portions of the first steel sheet element 11 and the second steel sheet element 12 are attached to each other, preferably by welding. Welds 15 are provided in the partially overlapping portion 14 of the flanges between said cut-outs 13, said welds being provided to attach the flanges of the first and the second steel sheet element to each other. Similarly, welds 15 are preferably provided in the partially overlapping portion of the central portion to attach the central portions of the first and the second steel sheet element to each other.

Figure 4:
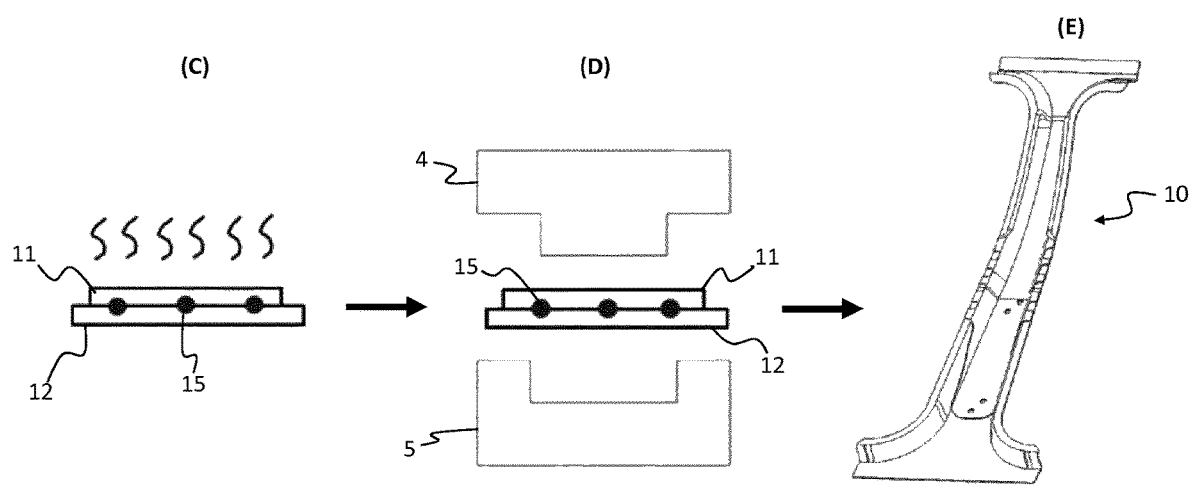
FIG. 4 illustrates a method of heating and forming the elongate steel plate into an elongate steel structure.

The forming of the elongate steel structure 10 is illustrated in FIG. 4.

After welding, the elongate sheet structure comprised of the first steel sheet element 11 and the second steel sheet 12 element are formed into an elongate structure, e.g. with a cross sectional hat-profile. Typically, the forming is made by stamping, and in a preferred embodiment the elongate sheet structure is heated prior to the stamping, such that the forming is performed by hot stamping. This is illustrated in FIG. 4 by a heating step (C), a forming step (D), typically hot stamping, and an assembled product (E).

Subsequent to the forming step (D), the elongate sheet structure (E) is ready for assembly. Each flange of the elongate sheet structure comprises a mid-portion in which the first and second steel sheet elements intermittently overlap each other. The overlapping portions of the flanges are at least partially attached to each other.

In FIG. 5, a subsequent process is shown, the portions of the flanges where there is no overlap, i.e. at the cut-outs, the flanges may be attached, e.g. welded, to both a panel 2 and a bodywork 1 of a vehicle, such that only three layers are included in the attachment/weld.

In FIG. 6 the mid-section of an elongate steel structure is shown arranged between a bodywork 1 and a cover plate 2.

FIGS. 7 and 8 are sectional views taken along the lines VII-VII and VIII-VIII, respectively, in FIG. 6.

As illustrated in FIG. 8, the hat-profile includes a central portion 17, two webs 18, and two flanges 19. The central portion 17 is an elongate substantially flat portion. The webs 18 are arranged alongside the central portion 17 in a common longitudinal direction, one web on each side of the central portion. As seen in the cross-sectional views, the webs 18 are arranged in an angle with respect to the central portion 17, typically between 45 and 90 degrees. The flanges 19 are arranged alongside the webs 18, one flange on each side of each web 18. The flanges 19 are arranged in an angle with respect to the webs 18, typically between 45 and 90 degrees, such that a plane formed by the flanges 19 is parallel to a plane formed by the central portion, said planes being separated by the extension of the webs 18 in an orthogonal direction with respect to planes of the central portion 17 and the flanges 19.

Preferably, the first and second steel sheets 11,12 are attached to each other by welds 15, typically spot welds, along the central portion 17, and along the two flanges 19. Welds may also be provided along the webs 18. Preferably though, no welds are provided along the transitional bent portions between the central portion and the webs, or between the webs and the respective flanges. This is because the welds may have a negative effect on the mechanical properties of the steel sheets. often, the steel will be more brittle at and around a weld.

At least one of the first and second steel sheet elements include cut-outs 13 along the flanges such that the overlap is interrupted along said flanges. These cut-outs are arranged to enable welding of the B-pillar to both a panel and a bodywork of a vehicle. Namely, it is preferred not to include more than three layers in a weld. Therefore, to avoid four layers when attaching these components, one of the first and second steel sheet elements include cut-outs 13 along the flanges 19 such that welds 16, typically spot welds, may be provided in the cut-outs, thereby attaching one of the first and second steel sheet elements to both a panel and an inner bodywork of a vehicle. As illustrated in FIG. 8, the first steel sheet element 11 comprises cut-outs and the flange of the second steel sheet element 12 is welded to the bodywork 1 and the cover plate 2 at a cut out, the cover plate 2 being formed so as to reach in to contact with the second steel sheet element 12 at said cut-out 13.

In the shown embodiment only one of the first and second steel sheet elements include cut-outs 13 along the flanges 19, namely the first steel plate 11. In another, not shown embodiment, cut-outs are provided in both the first and second steel sheet elements, either intermittently along both flanges, or instead cut-outs may be provided in a flange of the first steel sheet element at a first side and in an opposite flange of the second steel sheet element.

In the shown embodiment the first steel sheet element 11 forms an upper part of the B-pillar and the second steel sheet element 12 forms a lower part of the B-pillar wherein the first and second steel sheet elements overlap each other for a majority of a full length of the central portion, but not over the upper and lower parts of the B-pillar. As illustrated in FIG. 3 the first steel sheet element includes a first tongue 20 that overlaps a part of the central portion of the second steel sheet element and the second steel sheet element includes a second tongue 21 that overlaps a part of the central portion of the first steel sheet element. In the shown embodiment welds 15 are provided to attach the first tongue 20 to the central portion of the second steel sheet 12 element and welds 15 are provided to attach the second tongue 21 to the central portion of the first steel sheet element 11, preferably spot welds.

In the shown embodiment the two flanges 19 of the hat profile of the B-pillar formed by the two blanks are un-interrupted, the first steel sheet element providing the upper part of the flanges and the second steel sheet element providing a lower part of the flanges, and a partially over-lapping portion of the first and second steel sheet element providing a mid-section of the flanges, said partially over-lapping portion of the flanges including cut-outs in at least one of the first and the second steel sheet elements. Un-interrupted flanges of the hat profile of the B-pillar will contribute to the strength of the B-pillar.

Above, the invention has been described with reference to specific embodiments. The invention is however not limited to these embodiments. It is obvious to a person skilled in the art that other embodiments are possible within the scope of the following claims.

The invention claimed is:

1. An elongate steel structure for a vehicle comprising:
a first steel sheet element, and
a second steel sheet element, said first and second steel sheet elements constituting opposite ends of the elongate steel structure and said first and second steel sheet elements overlapping each other in a mid-portion of said elongate steel structure, but not over said opposite ends of the elongate steel structure,
wherein the first and the second steel sheet elements have an overlapping hat profile including a central portion, two webs, and two flanges, wherein at least one of the first and second steel sheet elements include cut-outs along the flanges, such that the overlap is interrupted along said flanges, and wherein both the first and second steel sheet elements include a tongue arranged to extend over the central portion of the opposite steel sheet element.

2. The elongate steel structure of claim 1, wherein only one of the first and second steel sheet elements include cut-outs along the flanges.

3. The elongate steel structure of claim 1, wherein the first steel sheet element forms an upper part of the elongate steel structure and the second steel sheet element forms a lower part of the elongate steel structure and wherein the first and second steel sheet elements overlap each other for a majority of a full length of the central portion.

4. The elongate steel structure of claim 3, wherein the first steel sheet element provides the upper part of the flanges, the second steel sheet element provides a lower part of the flanges, and a partially overlapping portion of the first and second steel sheet element provides a mid-section of the flanges, said partially overlapping portion of the flanges including cut outs.

5. The elongate steel structure of claim 4, wherein welds are provided in the partially overlapping portion of the flanges between said cut-outs, said welds being provided to attach the flanges of the first and the second steel sheet elements to each other.

6. The elongate steel structure of claim 1, wherein the first and second steel sheet elements have different mechanical properties.

7. The elongate steel structure of claim 1, wherein the first and second steel sheet elements have different thicknesses.

8. Method of forming an elongate steel structure for a vehicle from two sheet steel blanks, comprising producing the elongate steel structure in at least one forming step with overlapping steel sheet blanks, wherein separate portions of each steel blank and an overlapping portion of the sheet steel blanks therebetween is formed into a hat profile including a central portion, two webs, and two flanges, wherein the overlapping portion of the sheet steel blanks is two sheeted and wherein in said overlapping portion at least one of the first and second steel sheet blanks include cut-outs along the flanges such that the overlap is interrupted along said flanges at said cut-outs, wherein at least one of the first and second steel sheet elements includes a tongue arranged to extend over the central portion of the opposite steel sheet element, such that the overlap of the steel sheet elements is longer over the central portion than over the flanges, and wherein the steel sheet blanks are welded to each other along the edges of said tongue.

9. The method according to claim 8, wherein the forming of the steel sheet blanks is performed as hot shaping after heating of said steel sheet blanks.

10. The method according to claim 8, wherein the steel sheet blanks are welded to each other prior to the forming.

11. The method according to claim 10, wherein the steel sheet blanks are welded to each other in the flanges between the cut-outs.

12. The method according to claim 10, wherein the steel sheet blanks are welded to each other in the central portion.

\* \* \* \* \*